US012282860B2

(12) United States Patent
Veasey et al.

(10) Patent No.: US 12,282,860 B2
(45) Date of Patent: Apr. 22, 2025

(54) FORECASTING FOR RESOURCE ALLOCATION

(71) Applicant: Elasticsearch B.V., Mountain View, CA (US)

(72) Inventors: Thomas Veasey, York (GB); Stephen Dodson, London (GB)

(73) Assignee: Elasticsearch B.V., Amsterdam (NL)

( * ) Notice: Subject to any disclaimer, the term of this patent is extended or adjusted under 35 U.S.C. 154(b) by 856 days.

(21) Appl. No.: 15/855,823

(22) Filed: Dec. 27, 2017

(65) Prior Publication Data

US 2019/0197413 A1  Jun. 27, 2019

(51) Int. Cl.
*G06N 5/02* (2023.01)
*G06F 16/25* (2019.01)
*G06Q 10/04* (2023.01)
*G06Q 10/0631* (2023.01)

(52) U.S. Cl.
CPC ............. *G06N 5/02* (2013.01); *G06F 16/252* (2019.01); *G06Q 10/04* (2013.01); *G06Q 10/06312* (2013.01); *G06Q 10/06314* (2013.01); *G06Q 10/06315* (2013.01)

(58) Field of Classification Search
CPC ........ G06N 5/02; G06F 16/252; G06Q 10/04; G06Q 10/06312; G06Q 10/06314; G06Q 10/06315
See application file for complete search history.

(56) References Cited

U.S. PATENT DOCUMENTS 7,072,863 B1 * 7/2006 Phillips .................. G06Q 40/00
703/2
8,447,740 B1 * 5/2013 Huang ................ G06F 16/1748
707/692
9,582,080 B1   2/2017 Tilton et al.
9,798,754 B1  10/2017 Shilane et al.
10,198,339 B2 * 2/2019 Salunke .................. G06F 11/34

(Continued)

FOREIGN PATENT DOCUMENTS

EP        0336336 A1   10/1989
WO   WO2019133165 A1   7/2019

OTHER PUBLICATIONS

"International Search Report" and "Written Opinion of the International Searching Authority," Patent Cooperation Treaty Application No. PCT/US2018/062782, Feb. 19, 2019, 14 pages.

*Primary Examiner* — Omar F Fernandez Rivas
*Assistant Examiner* — Tri T Nguyen
(74) *Attorney, Agent, or Firm* — Quinn IP Law (57) ABSTRACT

Forecasting resource allocation is disclosed. An example method includes receiving operating data from a resource; applying periodicity tests to the received operating data using a plurality of sketches of time series of prior operating data, the periodicity tests generating periodic components; applying regression models to the received operating data, the regression models collectively generating a trend component, each regression model being applied over a different time scale of a plurality of time scales; computing a trend model using the periodic components and a trend component; determining a random process describing the historical evolution of the trend model; and calculating and providing a mean prediction, an upper bound, and a lower bound for resource utilization at a future time using the trend model and a predicted distribution.

22 Claims, 10 Drawing Sheets

(56) References Cited

U.S. PATENT DOCUMENTS

| | | | |
|---|---|---|---|
| 10,331,802 B2* | 6/2019 | Garvey | G06Q 10/04 |
| 2001/0024528 A1* | 9/2001 | Yokonuma | H04N 19/172 |
| | | | 382/239 |
| 2001/0045949 A1 | 11/2001 | Chithambraram et al. | |
| 2003/0164975 A1* | 9/2003 | Aoyagi | H04N 19/423 |
| | | | 375/E7.181 |
| 2003/0185439 A1* | 10/2003 | Malvar | H04N 19/60 |
| | | | 375/E7.044 |
| 2005/0283664 A1 | 12/2005 | Coulter, Jr. et al. | |
| 2008/0026704 A1* | 1/2008 | Maeda | H04L 5/023 |
| | | | 455/91 |
| 2008/0172671 A1* | 7/2008 | Bouillet | G06F 11/3447 |
| | | | 718/104 |
| 2009/0138301 A1* | 5/2009 | Wan | G06Q 30/0202 |
| | | | 705/7.31 |
| 2011/0112784 A1 | 5/2011 | Nikitin | |
| 2011/0299104 A1* | 12/2011 | Seo | G01J 3/2823 |
| | | | 358/1.9 |
| 2013/0041644 A1* | 2/2013 | Cremonesi | G06F 11/3452 |
| | | | 703/13 |
| 2013/0123996 A1* | 5/2013 | Matos | H02J 3/144 |
| | | | 700/291 |
| 2014/0258248 A1* | 9/2014 | Lambright | G06F 16/1748 |
| | | | 707/693 |
| 2014/0289386 A1* | 9/2014 | Vatto | H04L 41/145 |
| | | | 709/223 |
| 2015/0148040 A1* | 5/2015 | Ehrlich | H04W 24/02 |
| | | | 455/436 |
| 2016/0070593 A1 | 3/2016 | Harris et al. | |
| 2016/0132775 A1* | 5/2016 | Baughman | G06N 20/00 |
| | | | 706/12 |
| 2016/0328432 A1* | 11/2016 | Raghunathan | G06F 16/2264 |
| 2017/0012834 A1 | 1/2017 | Chan et al. | |
| 2017/0249376 A1* | 8/2017 | Garvey | G06Q 30/0202 |
| 2017/0249562 A1* | 8/2017 | Garvey | G06N 5/047 |
| 2017/0249649 A1* | 8/2017 | Garvey | G06Q 10/0631 |
| 2018/0060205 A1* | 3/2018 | Raj | G06F 11/3452 |
| 2018/0247215 A1* | 8/2018 | Garvey | G06N 20/00 |
| 2018/0349797 A1* | 12/2018 | Garvey | G06F 9/46 |
| 2019/0027162 A1* | 1/2019 | Fukayama | G06N 20/10 |
| 2019/0130425 A1* | 5/2019 | Lei | G06Q 10/0631 |
| 2019/0197413 A1 | 6/2019 | Veasey et al. | |

* cited by examiner

FORECASTING FOR RESOURCE ALLOCATION

TECHNICAL FIELD

The present technology relates generally to resource allocation, and more particularly to data analytics for resource allocation.

SUMMARY

Various embodiments of the present technology include a method for forecasting resource utilization, the method comprising: receiving operating data from a resource; applying periodicity tests to the received operating data using a plurality of sketches of time series of prior operating data, the periodicity tests generating periodic components; applying regression models to the received operating data, the regression models collectively generating a trend component, each regression model being applied over a different time scale of a plurality of time scales; computing a trend model using the periodic components and regression components; determining a random process describing the historical evolution of the trend model; and calculating and providing a mean prediction, an upper bound, and a lower bound for resource utilization at a future time using the trend model and a predicted distribution.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

In various embodiments, operating data of resources is obtained over time, resulting in a series of data points indexed (or listed or graphed) in time order called a time series. For example, the time series is a sequence of data taken at successive equally spaced points in time. Time series can be used for forecasting, decision making, and resource allocation, where a model is used to predict future values (e.g., at a particular future time) based on previously observed values.

By way of further non-limiting example, embodiments of the present invention can determine: if (how likely is it that) memory will exceed 32 GB any time next week, if (how likely is it that) disk utilization will reach 100% before the end of tomorrow, if (how likely is it that) a factory will run out of capacity before the end of next month, if (how likely is it that) personnel will be needed (e.g., no scheduled vacation allowed) during the holiday season, if (how likely is it that) temporary personnel (e.g., contractors) will be needed to fill a shortage of regular personnel during the holiday season, if (how likely is it that) additional equipment will need to be rented in August, and the like.

Additionally or alternatively, a model can be used to predict a future time or range of times at which particular future values will likely occur based on previously observed values. For example, embodiments of the present invention determine when the preceding examples will occur with an associated confidence level.

Figure 1:
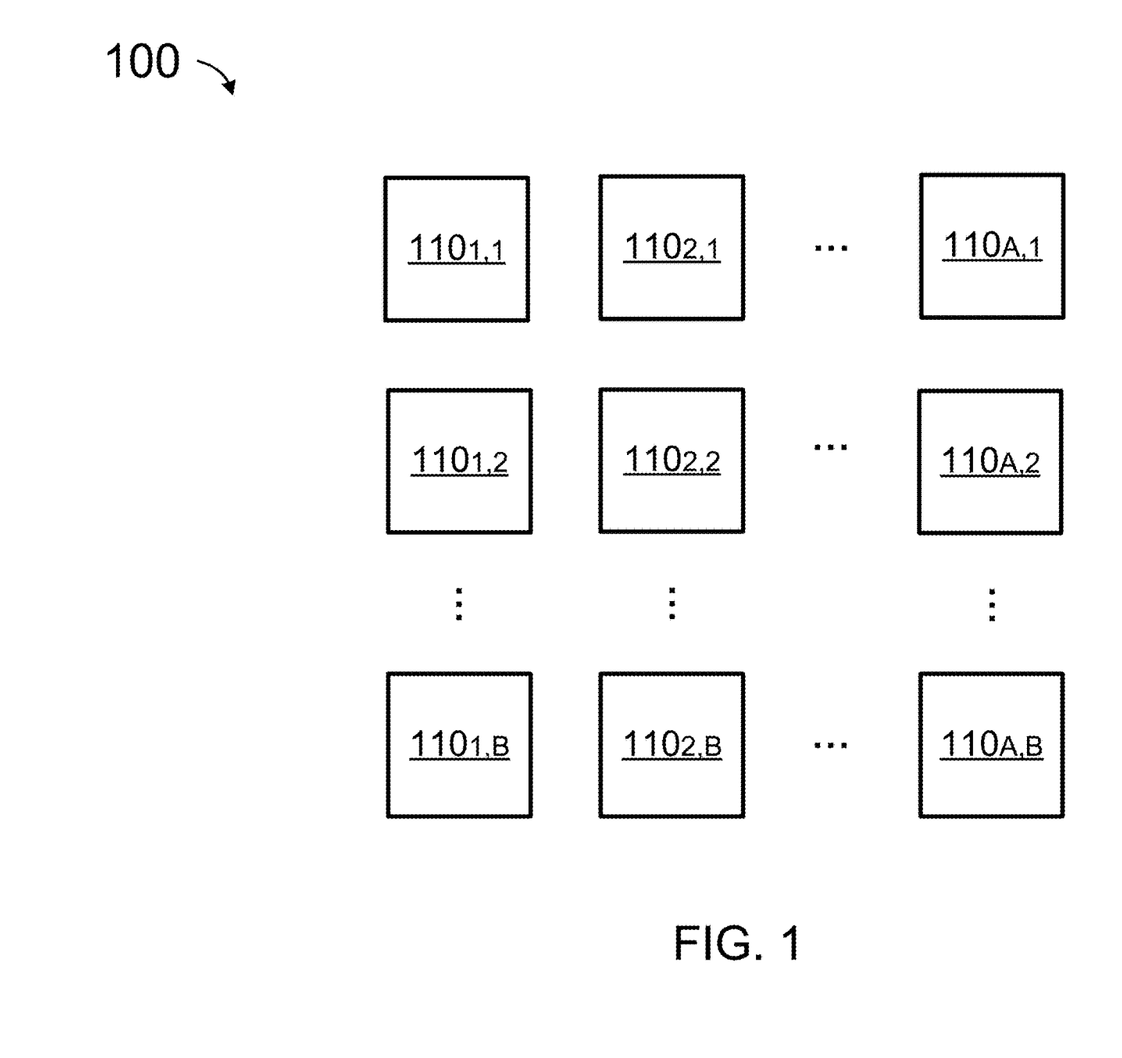
FIG. 1 is a simplified block diagram of multiple resources, according to some embodiments.
Figure 2A:
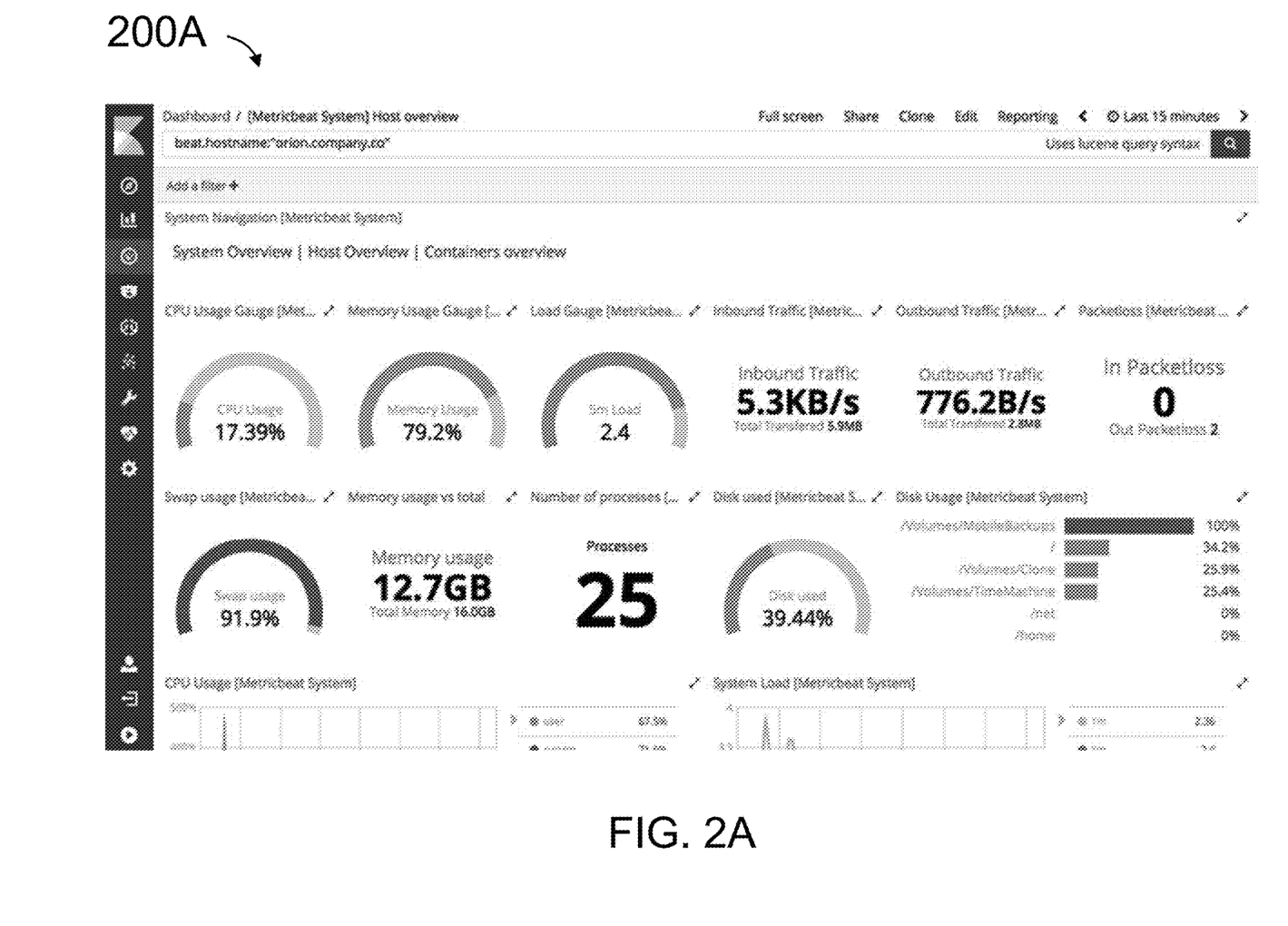
FIGS. 2A-2E illustrate operating data, according to various embodiments.
Figure 2B:
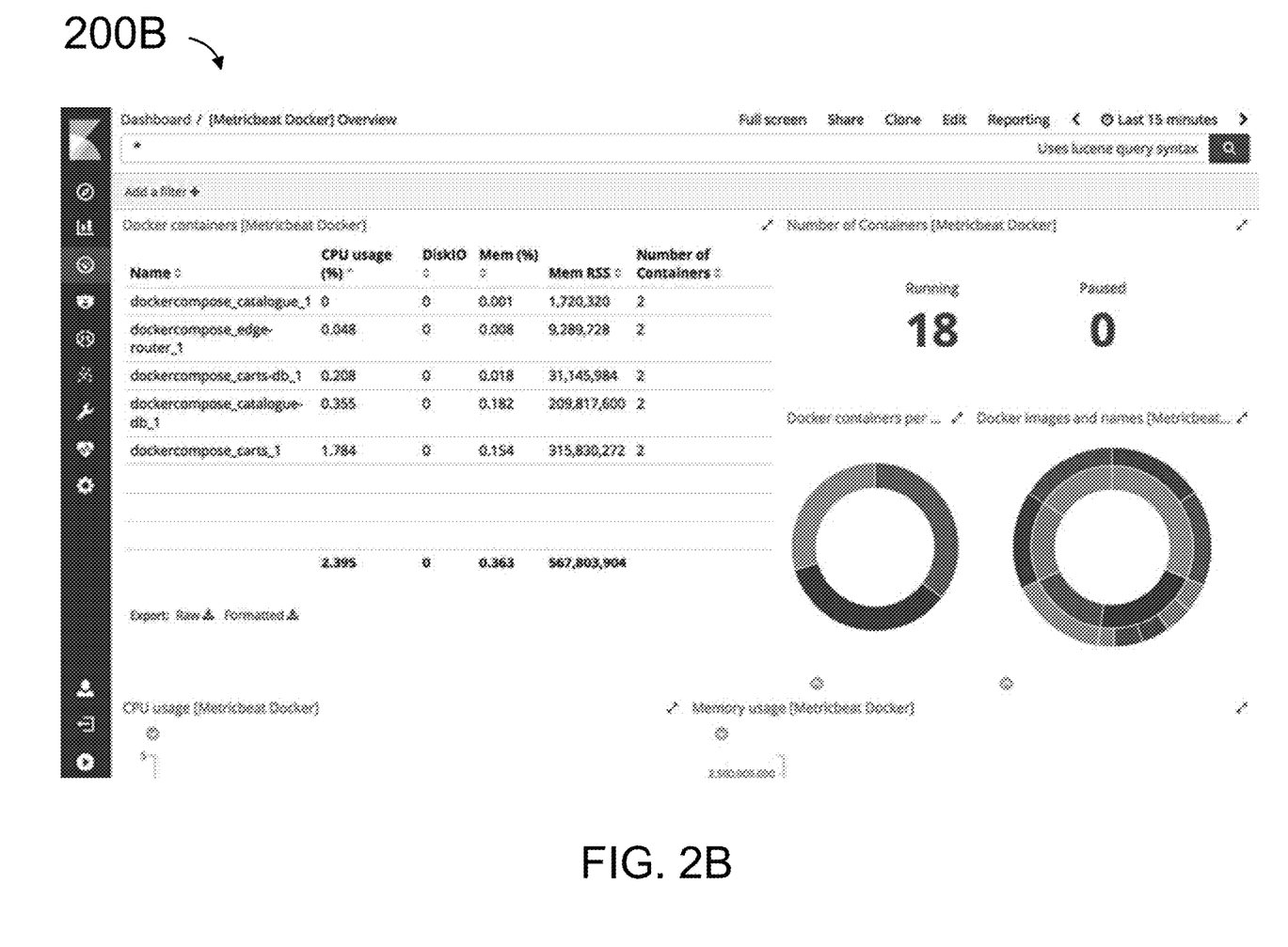
Figure 2C:
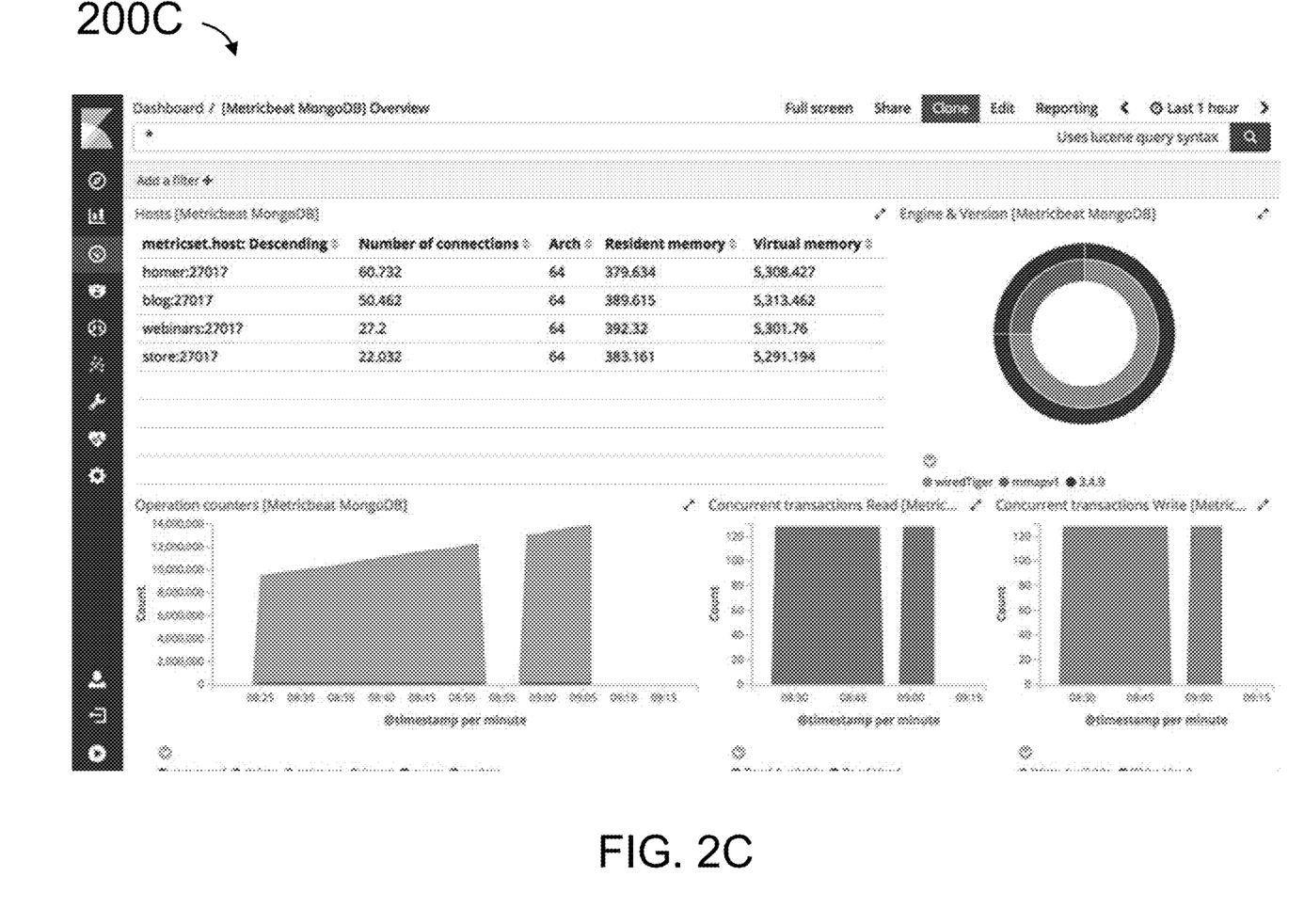
Figure 2D:
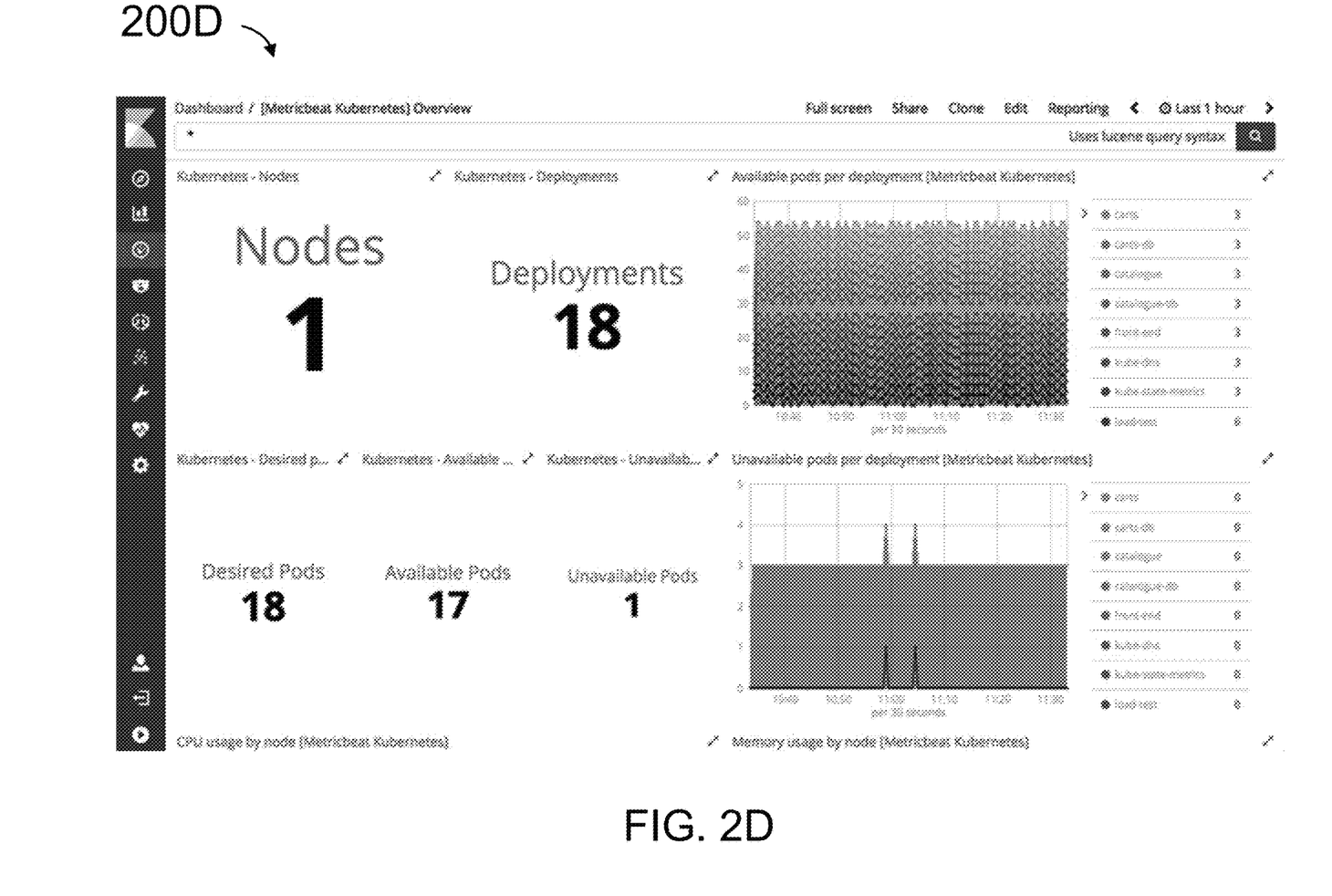
Figure 2E:
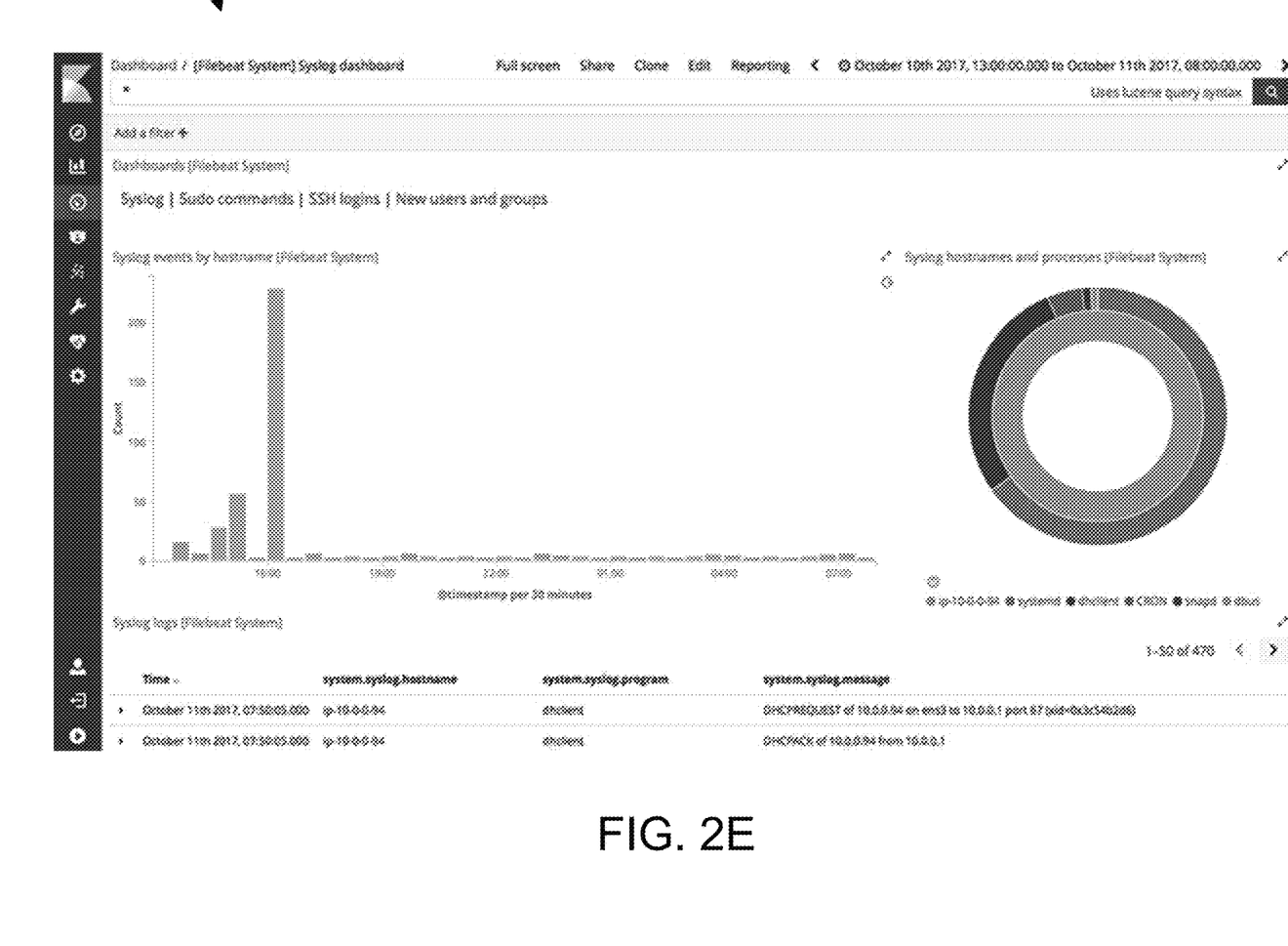

FIG. 1 depicts system 100 of resources $110_{1,1}$-$110_{A,B}$. Resources $110_{1,1}$-$110_{A,B}$ can be virtual or physical, such as factories, data centers, equipment, vehicles (e.g., taxis, delivery vans, trucks, ships, airplanes, helicopters, drones, etc.), computing resources in a cloud computing environment (e.g., computer system/server, virtual machine, container, etc.), personnel (e.g., pilots, drivers, machine operators, technicians, etc.), combinations thereof, and the like. By way of example, resources $110_{1,1}$-$110_{A,B}$ are owned and/or operated by one entity (e.g., an individual, company, government, etc.). By way of further non-limiting example, resources $110_{1,1}$-$110_{A,B}$ are provided to an entity as a (on-demand) service, such as on-demand cloud computing platforms (e.g., Amazon Web Services (AWS), Google Cloud Platform, Microsoft Azure, etc.). For example, resources $110_{1,1}$-$110_{A,B}$ are physical and/or virtual computing resources (hosts) where each host runs software (e.g., an agent) for detecting/sensing/measuring and sending operating data to a system for resource utilization forecasting which will be described further in relation to FIG. 3. Computing resources (computer systems) and cloud platforms (cloud-based computing systems) are described further in relation to FIG. 6

Although resources $110_{1,1}$-$110_{A,B}$ are shown in an array, each of resources $110_{1,1}$-$110_{A,B}$ can be disposed in same and/or different locations (e.g., factories, data centers, cities, counties, geographic regions, countries, continents, etc.). Each of resources $110_{1,1}$-$110_{A,B}$ can include a communications link, such as a wired and/or wireless communications network (e.g., Ethernet, Wi-Fi, Bluetooth, mobile broadband, etc.) connection, radio, modem, network adapter, and the like, for communications with a system for resource utilization forecasting, which will be described further in relation to FIG. 3. Each of resources $110_{1,1}$-$110_{A,B}$ can have operating data. Operating data can be data representing a present state of (e.g., data detected/sensed/measured at a particular time for) a resource. Taken over time, operating data can comprise a data series.

For example, vehicles can have operating data such as distance traveled, operating hours, fuel consumption, maximum speed, and the like. By way of further non-limiting example, personnel can have operating data such as hours on shift, number and duration of breaks, hours off duty, and the like. Taken over time, operating data can be a time series. By way of additional non-limiting examples, FIGS. 2A-2E show operating data 200A-200E for physical/virtual (cloud) computing resources, such as CPU usage, memory usage, inbound data traffic, outbound data traffic, in packet loss, out packet loss, swap usage, memory usage vs. total memory, number of processes, and disk usage. Operating data can be for a particular one of resources $110_{1,1}$-$110_{A,B}$ or a collection (set and/or subset) of resources $110_{1,1}$-$110_{A,B}$ combined (e.g., averaged). Depending upon the type of resource, different operating data can be used.

Figure 3:
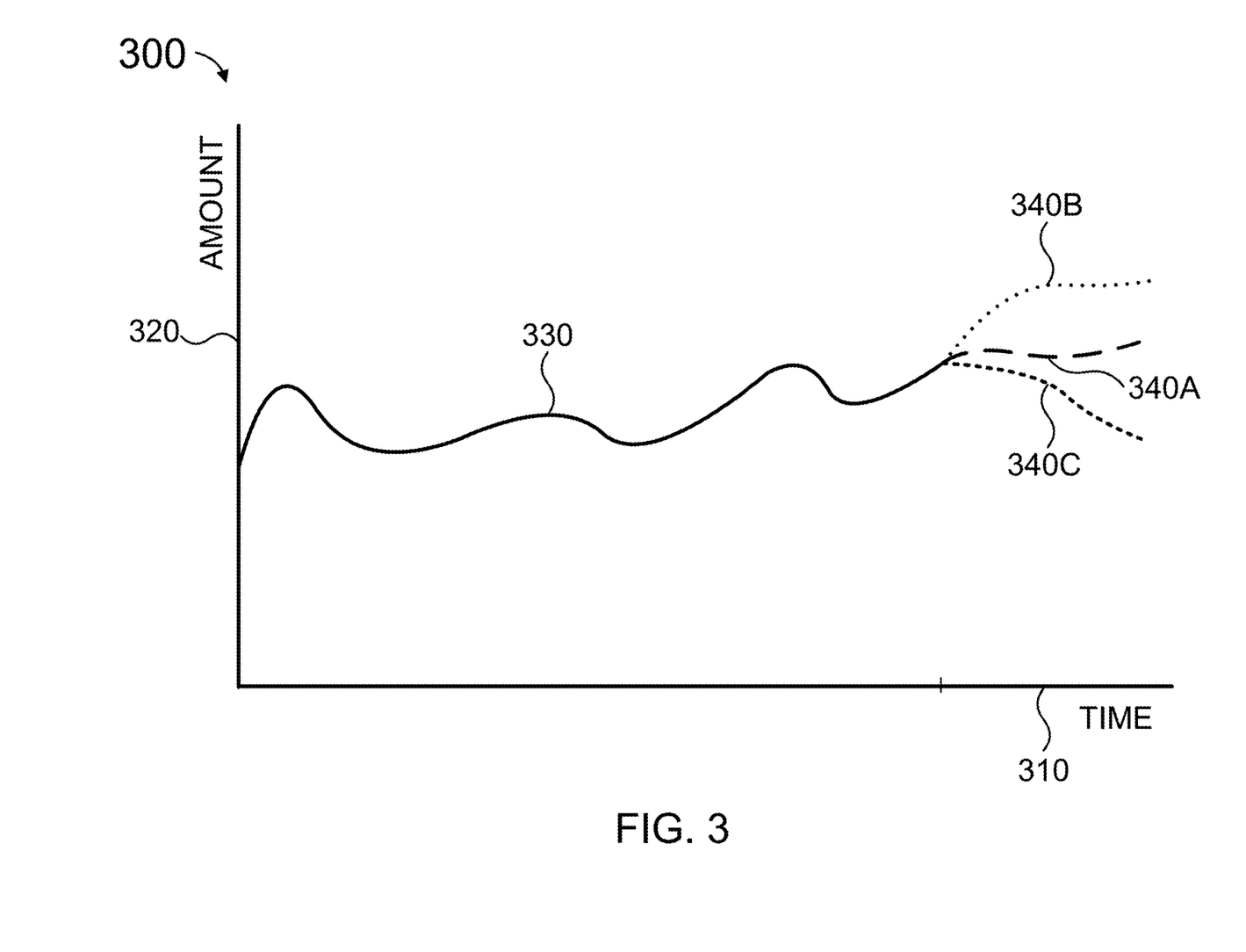
FIG. 3 graphically depicts actual and forecasted operating data, in accordance with some embodiments.

FIG. 3 depicts graphical representation 300 of actual and forecasted time series. Graphical representation includes time axis 310, quantity axis 320, actual time series 330 and forecasted time series. Actual time series 330 can include actual operating data (e.g., data detected/sensed/measured for a resource at certain time). The forecasted time series includes mean forecasted time series 340A, upper bound forecasted time series 340B, and lower bound forecasted time series 340C. Mean forecasted time series 340A is a mean or average representing a central tendency of the operating data. Upper bound forecasted time series 340B and lower bound forecasted time series 340C can represent maximum and minimum forecasted values (e.g., distribution) of the operating data, respectively.

Figure 4:
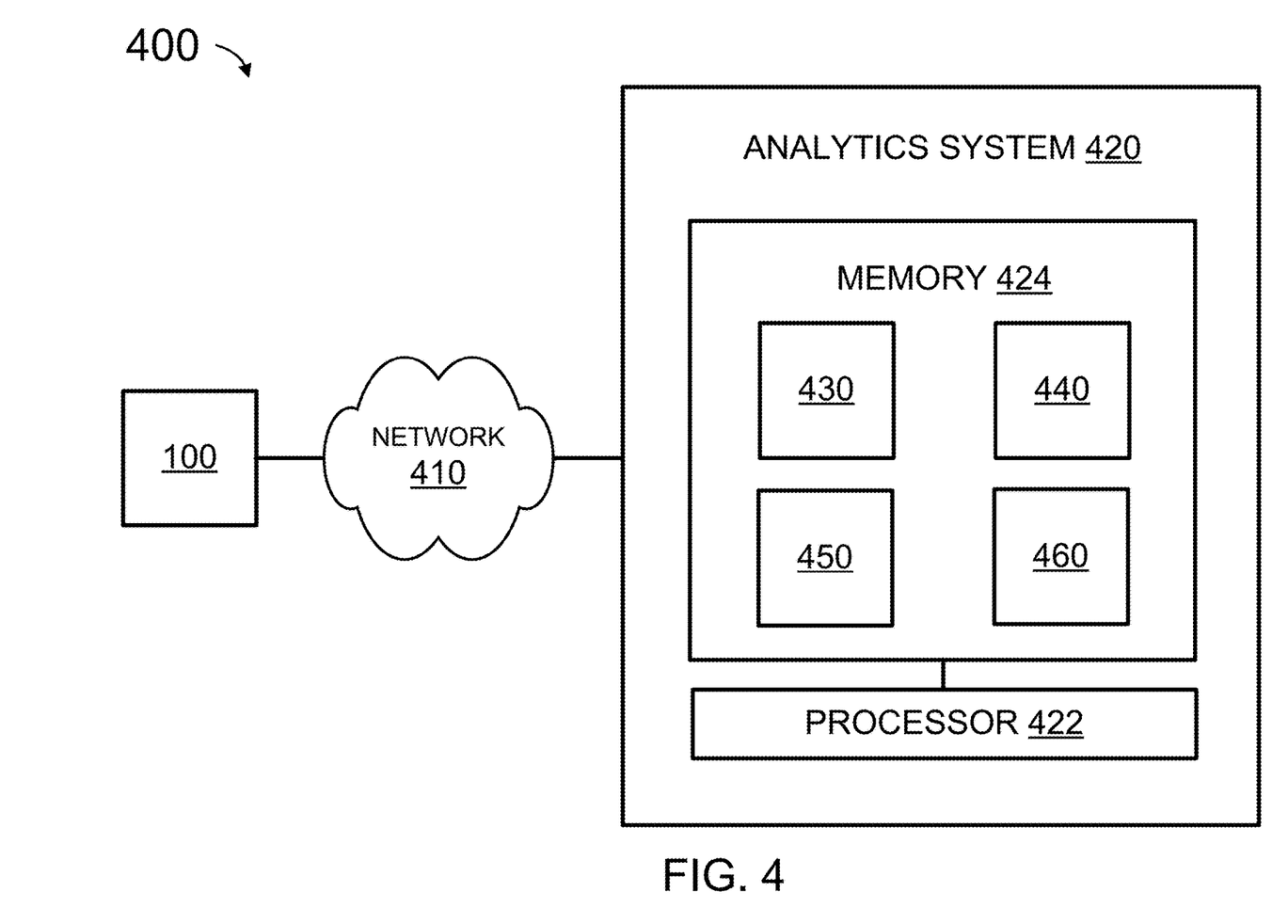
FIG. 4. is a simplified block diagram of computing architecture for practicing aspects of the present technology.

FIG. 4 illustrates a simplified block diagram of system 400 for resource utilization forecasting. System 400 can include system 100 (e.g., resources $110_{1,1}$-$110_{A,B}$ of FIG. 1), network 410, and analytics system 420. Resources $110_{1,1}$-$110_{A,B}$ were described above in relation to FIG. 1 Network 410 can include various combinations and permutations of radios, modems, network adapters, wireless and/or wired data networks (e.g., Ethernet, Wi-Fi, Bluetooth, mobile broadband, the Internet, etc.), and the like for system 100 (e.g., resources $110_{1,1}$-$110_{A,B}$) to provide operating data to analytics system 420. Network 410 is described further in relation to FIG. 6.

Analytics system 420 can include processor 422 and memory 424 for storing instructions. Memory 424 can include input interface module 430, function module 440, distribution module 450, and allocation module 460. As used herein, the terms "module" may also refer to any of an application-specific integrated circuit (ASIC), field programmable gate array (FPGA), application-specific standard product (ASSP), an electronic circuit, a processor (shared, dedicated, or group) that executes one or more software or firmware programs, a combinational logic circuit, and/or other suitable components that provide the described functionality. Analytics system 420 (computing system) is described further in relation to FIG. 6.

In some embodiments, analytics system 420 receives an input stream from system 100 (e.g., one or more of resources $110_{1,1}$-$110_{A,B}$) via input interface module 430. An input stream may include individual and/or multiple data instances that are detected/sensed/measured over a period of time. Each data instance (or components thereof) may be time stamped so that a chronological order can be maintained for the data instances and/or include identifying information for the resource to which the individual data instance pertains.

According to some embodiments, function module 440 operates on a compressed representation of the (actual) time series, instead of storing large times series in mass storage, such as a disk. Function module 440 can operate in an "online" fashion using compressed representation of the time series as new actual operating data comes in, instead of operating from a large stored time series. For example, instead of storing all of the prior actual data (e.g., the whole time series), a sketch data structure holds summaries (sketches) of the time series. Sketch data structures can be used to store a summary of a data set in situations where the whole data would be prohibitively costly to store in a fast-access place like the memory as opposed to the hard disk. By way of further example, a collection of different sketches can be maintained by function module 440 for different time scales.

Function module 440 can estimate a function $\bar{x}(t)$ (e.g., mean forecasted time series 320A in FIG. 3) using received new actual operating data from system 100 (e.g., one or more of resources $110_{1,1}$-$110_{A,B}$) and the sketches. An estimate of function $\bar{x}(t)$ can also be referred to as a trend model. In various embodiments, estimating function $\bar{x}(t)$ can include testing for seasonality (or periodicity) in the operating data (time series). Seasonality (or periodicity) is a characteristic of a time series in which the data experiences regular and predictable changes that recur every calendar year (or other time period). Any predictable change or pattern in a time series that recurs or repeats over a one-year (or other time) period can be said to be seasonal (or periodic).

Multiple sketches can be used to test for a range of seasonal (or periodic) components. Typically higher compression is used in sketches to test for longer periodicities in such a way that storage remains more or less fixed to summarize an expanding time window in a manner suitable for determining if seasonal (or periodic) components are present. According to various embodiments, hypothesis testing is performed to find if seasonal (or periodic) components are present in the data and, if so, those best explaining the observed patterns. Basically, hypothesis testing determines whether results are valid by calculating the probability that the results happened by chance. If results may have happened by chance, the results are undesirable. For example, hypothesis testing includes: a custom hypothesis test for fitting a variety of smooth periodic components (e.g., frequently occurring periodic components such as hourly, daily, weekly, weekend/weekday and daily, etc.); a custom hypothesis test for periodic spikes; and custom test for periodic component in the variance of the time series. In some embodiments, analysis of cyclic autocorrelation is also used to find possible arbitrary periodic components, which are included in the hypothesis testing process. These tests identify the seasonal (or periodic) components that should be added to the function $\bar{x}(t)$.

According to various embodiments, estimating a function $\bar{x}(t)$ also includes modeling a trend component in the data series using multiple regression models. The prediction for value(s) of the operating data at a future time (e.g., has not occurred, yet) can be broken down additively into a prediction from a trend component and a prediction from zero or more seasonal (or periodic) components. The regression models can operate on different time scales (e.g., being required to fit historical values of the operating data over different time spans). Each of the regression models can be updated with received new actual operating data from one or more of resources $110_{1,1}$-$110_{A,B}$. In some embodiments, a space (memory) efficient online formulation of weighted least squares is used for each regression model. The formulation of weighted least squares advantageously supports the reduction in the significance of old data, at a specified rate, in a smooth fashion and so also supports operating at a specified time scale. The prediction from the regression models can be combined using a weighted mean to generate a prediction from the trend component. The weighting can be adjusted depending on how far into the future the prediction is being made.

The trend model can further compensate for spikes and step discontinuities. For example, the step discontinuities can be mitigated using an additive piecewise constant function. Testing for predictive calendar components can be performed. A variety of features, such as day of month, day until end of month, day of week, week of month, and the like can be considered. There can be additive corrections (e.g., a component included in the trend model) for each predictive calendar component.

In addition to producing the estimate of function $\bar{x}(t)$ (trend model), function module can update the sketches and the components of the trend model to incorporate new actual operating data.

Distribution module 460 can determine a predicted distribution $f(x(t)|x(t))$ (e.g., upper bound forecasted time series 320B and lower bound forecasted time series 320C in FIG. 3) using the trend model. The predicted distribution is a parametric probability distribution that is overlaid on the trend model to define the bounds of the prediction. Distribution module 460 can further determine a random process describing the historical evolution of the trend model or a probabilistic model that characterizes the unpredictable components in the historical predictions or data.

For example, a Wiener process is fitted to the trend regression model parameter time series. The time series may be modeled as a combination of a trend model and a probability distribution. By way of further non-limiting example, the statistical properties of the time between step discontinuities and/or the signed magnitude of step discontinuities are modeled. The Wiener process and/or statistical properties of step discontinuities can be used to model plausible future changes in the actual values of the operating data x (t) over time. In some embodiments, a residual distribution of historical predictions can also be estimated in an online fashion, such as by fitting a distribution to $\{x(t_i)-x(t_i)\}$ for (all) the actual data series (e.g., prior actual data). In order to produce an empirical estimate of $f(x(t)|x(t))$ the Wiener process, step discontinuity model and residual distribution model can be sampled to generate multiple candidate future forecasts.

Allocation module 460 can use the estimate of function $\bar{x}(t)$ (trend model) from function module 440 and predicted distribution $f(x(t)|\bar{x}(t))$ from distribution module 450 to provide a resource utilization forecast (e.g., all or part of graphical representation 300 in FIG. 3; other graphs, charts, and data representations can be used). In some embodiments, the resource utilization forecast can be provided to decision makers in the entity for resource allocation decisions (e.g., bring new resources online; bring under-utilized resources offline such as for maintenance or sale; re-allocate resources to other projects, business units of the entity, or other entities; schedule resources such as for busy or slow periods, forecasting revenue, and the like). In various embodiments, allocation module 460 can communicate with other enterprise systems (not depicted in FIG. 4) for resource scheduling, reservation, provisioning, and the like. For example, allocation module 460 based on forecasted utilization (demand) can decrease and/or increase a number of resources, schedule resources (e.g., vehicles and/or operators), and the like.

Figure 5:
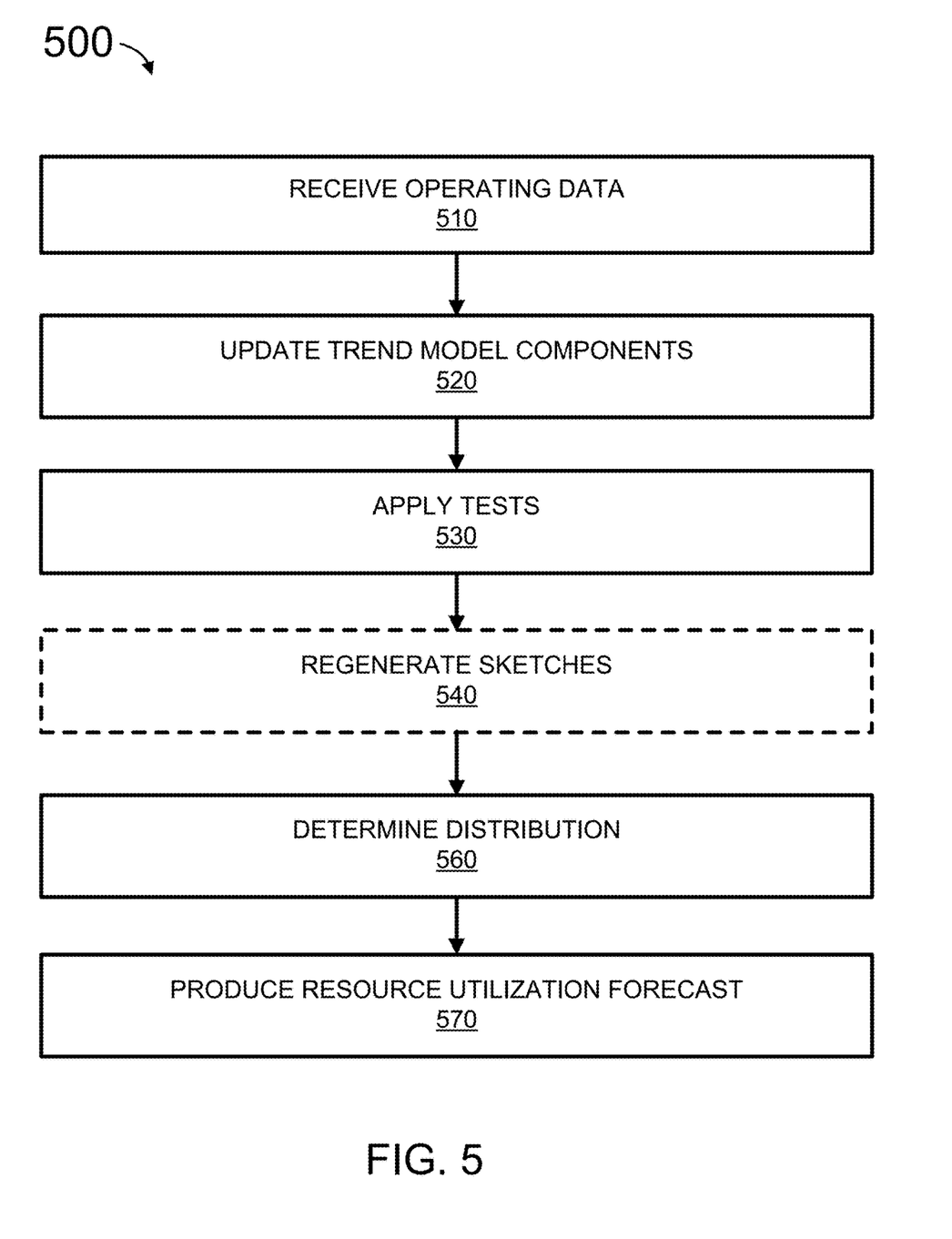
FIG. 5 is a simplified flow diagram of a method for forecasting operating data, in accordance with various embodiments.

FIG. 5 illustrates method 500 for resource utilization forecasting, according to some embodiments. Although the steps of method 500 are depicted sequentially, the steps can be performed in a different order, sequentially, concurrently, and combinations thereof. Method 500 can be performed by all or part of system 400 (FIG. 4). Method 500 can commence at step 510, where new actual data is received. In some embodiments, new actual data is received using input interface module 430 (FIG. 4).

At step 520, all the existing trend model components are updated with the new data. For example, a trend component comprising several regression models over different time scales (as described above in relation to FIG. 4) are updated with the new actual data.

At step 530, at least one of new seasonality/periodicity, predictive calendar, spikes, and step discontinuity components can be added to the function $\bar{x}(t)$ (trend model). For example, seasonality/periodicity, predictive calendar, spikes, and step discontinuity tests (as described above in relation to FIG. 4) are applied to the new actual received data and sketches. These may decide to add additional components to the model.

Optionally at step 540, the sketches can be re-generated or updated with the new actual data. In some embodiments, steps 520-540 are performed by function module 440 (FIG. 4).

At step 550, a predicted distribution $f(x(t)|\bar{x}(t))$ can be determined using the estimate of function $\bar{x}(t)$ (trend model) (as described above in relation to FIG. 4). Optionally at step 550, the residual distribution of the historical predictions is estimated (not shown in FIG. 5). In some embodiments, step 560 is performed by distribution module 450.

At step 560, a resource utilization forecast is produced using the estimate of function $\bar{x}(t)$ (trend model) and predicted distribution $f(x(t)|\bar{x}(t))$ (as described above in relation to FIG. 4). Optionally at step 560, resources can be allocated (as described above in relation to FIG. 4) (not shown in FIG. 5).

Method 500 can be performed separately on different types of operating data. By way of non-limiting example, method 500 can be performed individually on CPU utilization, disk utilization, and memory utilization (sequentially or concurrently). Depending on the type of resource, method 500 can be applied individually to different types and/or combinations of operating data.

Figure 6:
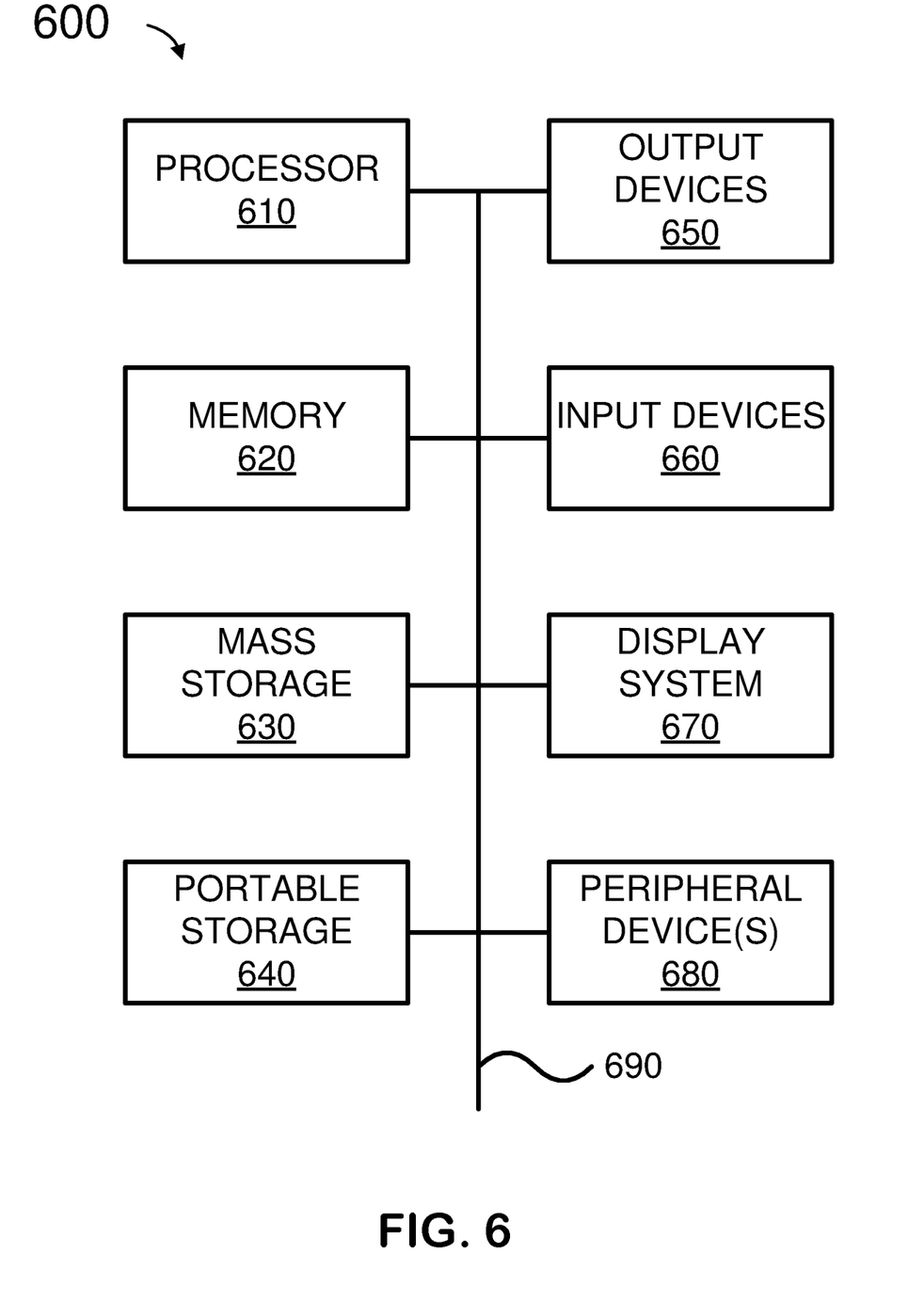
FIG. 6 is a schematic diagram of a computing system, according to some embodiments.

FIG. 6 illustrates an exemplary computer system (or computing system) 600 that may be used to implement some embodiments of the present invention. The computer system 600 in FIG. 6 may be implemented in the contexts of the likes of computing systems, networks, servers, or combinations thereof. The computer system 600 in FIG. 6 includes processor unit(s) 610 and main memory 620. Main memory 620 stores, in part, instructions and data for execution by processor unit(s) 610. Main memory 620 stores the executable code when in operation, in this example. The computer system 600 in FIG. 6 further includes a mass data storage 630, portable storage device 640, output devices 650, user input devices 660, a graphics display system 670, and peripheral device(s) 680.

The components shown in FIG. 6 are depicted as being connected via a single bus 690. The components may be connected through one or more data transport means. Processor unit(s) 610 and main memory 620 are connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit(s) 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 in FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral device(s) 680 may include any type of computer support device to add additional functionality to the computer system.

The components provided in the computer system 600 in FIG. 6 are those typically found in computer systems that may be suitable for use with embodiments of the present disclosure and are intended to represent a broad category of such computer components that are well known in the art. Thus, the computer system 600 in FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 600 may be implemented as a cloud-based computing environment, such as a virtual machine and/or container operating within a computing cloud. In other embodiments, the computing system 600 may itself include a cloud-based computing environment, where the functionalities of the computing system 600 are executed in a distributed fashion. Thus, the computing system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for resource utilization forecasting comprising:
    receiving operating data from a resource;
    applying periodicity tests to the received operating data using a plurality of sketches of time series of prior operating data, the periodicity tests generating periodic components, the plurality of sketches being generated using compression to test for a seasonal periodicity such that the operating data represents data values across an identified repeating time interval, wherein an amount of the compression used on a particular sketch is directly proportional to the time series covered by the sketch to allow each of the plurality of sketches to use a fixed amount of storage;
    re-generating at least some of the plurality of sketches when new operating data is received;
    applying the periodicity tests to the new operating data using the re-generated sketches to generate updated periodic components;
    applying regression models to the received operating data, the regression models collectively generating a trend component, each regression model being estimated over a different time scale of a plurality of time scales, wherein contributions of the regression models to the trend component depend on weights of the regression models, the weights being adjusted based on a value of a future time the trend component being predicted at;
    computing a trend model using the periodic components, the updated periodic components, and the trend component, the trend model comprising an additive correction component to compensate for spikes and step discontinuities;
    determining a random process describing the historical evolution of the trend model characterizing components in the historical data; and
    calculating and providing a mean prediction, an upper bound, and a lower bound for resource utilization at a future time using the trend model and a predicted distribution, wherein the predicted distribution is a parametric probability distribution that is overlaid on the trend model to define the bounds of the mean prediction.

2. The method of claim 1, wherein each of the plurality of sketches holds a different version of the time series of prior operating data, each of the plurality of sketches has a different amount of compression of the time series of prior operating data, and the plurality of sketches are used by the periodicity tests to test for a range of periodicities using the different amounts of compression in the plurality of sketches.

3. The method of claim 2, wherein the periodicity tests include a hypothesis test for fitting multiple smooth periodic components, the periodic components including at least one of hourly, daily, weekly, weekend, and weekday.

4. The method of claim 3, wherein the periodicity tests further include a hypothesis test for periodic spikes in the received operating data and a first subset of sketches from the plurality of sketches of time series of prior operating data.

5. The method of claim 4, wherein the periodicity tests further include a test for periodicity in the variance in the received operating data and a second subset of sketches from the plurality of sketches of time series of prior operating data.

6. The method of claim 5, wherein the periodicity tests include a test for arbitrary periodic behavior in the received operating data and a third subset of sketches from the plurality of sketches of time series of prior operating data, the test for arbitrary period behavior including an analysis of cyclic autocorrelation.

7. The method of claim 1, wherein computing the trend model includes adding the periodic components and the trend component.

8. The method of claim 1, wherein the regression models of the trend component are combined using a weighted sum.

9. The method of claim 1, wherein determining the predicted distribution of the trend model includes fitting a Wiener process to the historical evolution of the regression models.

10. The method of claim 8, wherein determining the random process describing the evolution of the trend model includes modeling statistical properties of at least one of the time between step discontinuities and signed magnitudes of the step discontinuities.

11. The method of claim 1 further comprising:
    allocating resources using the mean prediction, the upper bound, and the lower bound.

12. A system comprising:
a processor; and
a memory coupled to the processor, the memory storing instructions executable by the processor to perform a method, the method comprising:
receiving operating data from a resource;
applying periodicity tests to the received operating data using a plurality of sketches of time series of prior operating data, the periodicity tests generating periodic components, the plurality of sketches being generated using compression to test for a seasonal periodicity such that the operating data represents data values across an identified repeating time interval, wherein an amount of the compression used on a particular sketch is directly proportional to the time series covered by the sketch to allow each of the plurality of sketches to use a fixed amount of storage;
re-generating at least some of the plurality of sketches when new operating data is received;
applying the periodicity tests to the new operating data using the re-generated sketches to generate updated periodic components;
applying a plurality of regression models to the received operating data, each regression model being applied over a different time scale, the regression models collectively generating a trend component, wherein contributions of the regression models to the trend component depend on weights of the regression models, the weights being adjusted based on a value of a future time the trend component being predicted at;
computing a trend model using the periodic components, the updated periodic components, and the trend component, the trend model comprising an additive correction component to compensate for spikes and step discontinuities;
determining a random process describing historical evolution of the trend model characterizing components in the historical data; and
calculating and providing a mean prediction, an upper bound, and a lower bound for resource utilization at a future time using the trend model and a predicted distribution, wherein the predicted distribution is a parametric probability distribution that is overlaid on the trend model to define the bounds of the mean prediction.

13. The system of claim 12, wherein each of the plurality of sketches holds a different version of the time series of the prior operating data, each of the plurality of sketches has a different amount of compression of the time series of the prior operating data, and the plurality of sketches are used by the periodicity tests to test for a range of periodicities using the different amounts of compression of the plurality of sketches.

14. The system of claim 12, wherein the periodicity tests include a hypothesis test for fitting multiple smooth periodic components, the periodic components including at least one of hourly, daily, weekly, weekend, and weekday.

15. The system of claim 13, wherein the periodicity tests further include a hypothesis test for periodic spikes in the received operating data and a first subset of sketches from the plurality of sketches of time series of prior operating data.

16. The system of claim 14, wherein the periodicity tests further include a test for variance in the received operating data and a subset of sketches from the plurality of sketches of time series of prior operating data.

17. The system of claim 15, wherein the periodicity tests include a test for arbitrary periodic behavior in the received operating data and a third subset of sketches from the plurality of sketches of time series of prior operating data, the test for arbitrary period behavior including an analysis of cyclic autocorrelation.

18. The system of claim 12, wherein computing the trend model includes adding the periodic components and the trend component.

19. The system of claim 12, wherein the regression models of the trend component are combined using a weighted sum.

20. The system of claim 12, wherein determining the predicted distribution of the trend model includes fitting a Wiener process to the historical evolution of the regression models.

21. The system of claim 18, wherein determining the predicted distribution of the trend model includes modeling statistical properties of at least one of the time between step discontinuities in the received operating data and signed magnitudes of the step discontinuities.

22. A non-transitory computer-readable storage medium having embodied thereon instructions, which when executed by at least one processor, perform steps of a method, the method comprising:
receiving operating data from a resource;
applying periodicity tests to the received operating data using a plurality of sketches of time series of prior operating data, the periodicity tests generating periodic components, the plurality of sketches being generated using compression to test for a seasonal periodicity such that the operating data represents data values across an identified repeating time interval, wherein an amount of the compression used on a particular sketch is directly proportional to the time series covered by the sketch to allow each of the plurality of sketches to use a fixed amount of storage;
re-generating at least some of the plurality of sketches when new operating data is received;
applying the periodicity tests to the new operating data using the re-generated sketches to generate updated periodic components;
applying a plurality of regression models to the received operating data, each regression model being applied over a different time scale, the regression models collectively generating a trend component, wherein contributions of the regression models to the trend component depend on weights of the regression models, the weights being adjusted based on a value of a future time the trend component being predicted at;
computing a trend model using the periodic components, the updated periodic components, and the trend component, the trend model comprising an additive correction component to compensate for spikes and step discontinuities;
determining a random process describing historical evolution of the trend model characterizing components in the historical data; and
calculating and providing a mean prediction, an upper bound, and a lower bound for resource utilization at a future time using the trend model and a predicted distribution, wherein the predicted distribution is a parametric probability distribution that is overlaid on the trend model to define the bounds of the mean prediction.

* * * * *